(12) United States Patent
Liu et al.

(10) Patent No.: US 11,588,246 B2
(45) Date of Patent: Feb. 21, 2023

(54) NFC ANTENNA STRUCTURE AND NFC CIRCUIT BOARD AND WIRELESS CHARGER USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yong-Qing Liu, Taipei (TW); De-Zhi Kao, Taipei (TW); Jui-Chun Liang, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 380 days.

(21) Appl. No.: 16/928,744

(22) Filed: Jul. 14, 2020

(65) Prior Publication Data
US 2021/0066802 A1    Mar. 4, 2021

(30) Foreign Application Priority Data
Aug. 30, 2019   (CN) .................. 201910811503.X

(51) Int. Cl.
*H01Q 7/00*   (2006.01)
*H01Q 1/52*   (2006.01)
*H01Q 1/38*   (2006.01)

(52) U.S. Cl.
CPC .............. *H01Q 7/00* (2013.01); *H01Q 1/38* (2013.01); *H01Q 1/526* (2013.01)

(58) Field of Classification Search
CPC ............ H01Q 7/00; H01Q 1/38; H01Q 1/526; H01Q 1/36; H01Q 1/22; H02J 50/60; H02J 7/0044; H02J 50/005; H02J 50/402; H02J 50/10; H02J 7/00; H02J 50/20; H04B 5/0031; H04B 5/0081; H04B 5/0037
See application file for complete search history.

(56) References Cited

U.S. PATENT DOCUMENTS

| | | | | |
|---|---|---|---|---|
| 2012/0235636 A1* | 9/2012 | Partovi | ............... | H04B 5/0093 320/108 |
| 2018/0301790 A1* | 10/2018 | Kim | ....................... | H05K 1/165 |
| 2020/0044695 A1* | 2/2020 | Biederman | ............ | A61B 5/002 |
| 2020/0251929 A1* | 8/2020 | Partovi | ................... | H01F 38/14 |

FOREIGN PATENT DOCUMENTS

CN          104092020 B      1/2017

* cited by examiner

*Primary Examiner* — David E Lotter
(74) *Attorney, Agent, or Firm* — Innovation Counsel LLP

(57) ABSTRACT

A Near-Field Communication (NFC) antenna structure includes an NFC antenna and a conductive structure. The NFC antenna extends to form an inner coil and an outer coil. The conductive structure is formed corresponding to a region between the inner coil and the outer coil.

20 Claims, 10 Drawing Sheets

NFC ANTENNA STRUCTURE AND NFC CIRCUIT BOARD AND WIRELESS CHARGER USING THE SAME

This application claims the benefit of People's Republic of China application Serial No. 201910811503.X, filed on Aug. 30, 2019, the subject matter of which is incorporated herein by reference.

BACKGROUND OF THE INVENTION

Field of the Invention

The invention relates in general to a Near-Field Communication (NFC) antenna structure and an NFC circuit board and a wireless charger using the same, and more particularly to an NFC antenna structure having a conductive structure and an NFC circuit board and a wireless charger using the same.

Description of the Related Art

The conventional wireless charger includes a plurality of induction coils and an NFC antenna for sensing foreign objects. When the mobile phone communicates with (such as pairing) the NFC antenna of the wireless charger, the induction coils and charging coils of the wireless charger may interfere with the transmission of NFC signals, resulting in failure of the pairing of the mobile phone and the NFC antenna of the wireless charger. Therefore, how to provide a new NFC antenna structure to improve the foregoing problems is one of the efforts of those skilled in the art.

SUMMARY OF THE INVENTION

The invention is directed to an NFC antenna structure, an NFC circuit board and a wireless charger using the same capable of resolving the aforementioned problems.

According to one embodiment of the present invention, an NFC antenna structure is provided. The NFC antenna structure includes an NFC antenna and a conductive structure. The NFC antenna circlewise extends to form a first inner coil and a first outer coil. The conductive structure is formed corresponding to a region between the first inner coil and the first outer coil.

According to one embodiment of the present invention, an NFC circuit board is provided. The NFC circuit board includes a substrate, a first induction coil, a second induction coil and an NFC antenna structure. The substrate has a first surface and a second surface opposite to the first surface. The first induction coil is formed on the first surface. The second induction coil is formed on the second surface. The NFC antenna is formed between the first induction coil and the second induction coil. The NFC antenna structure includes an NFC antenna and a conductive structure. The NFC antenna circlewise extends to form a first inner coil and a first outer coil. The conductive structure is formed corresponding to a region between the first inner coil and the first outer coil.

According to one embodiment of the present invention, a wireless charger is provided. The wireless charger includes an NFC circuit board, a plurality of charging coils and a base. The NFC circuit board includes a substrate, a first induction coil, a second induction coil and an NFC antenna structure. The substrate has a first surface and a second surface opposite to the first surface. The first induction coil is formed on the first surface. The second induction coil is formed on the second surface. The NFC antenna is formed between the first induction coil and the second induction coil. The NFC antenna structure includes an NFC antenna and a conductive structure. The NFC antenna circlewise extends to form a first inner coil and a first outer coil. The conductive structure is formed corresponding to a region between the first inner coil and the first outer coil. The charging coils is configured to charge an electronic device placed on the wireless charger. The base is configured to receive the main circuit board, the charging coils and the NFC circuit board.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
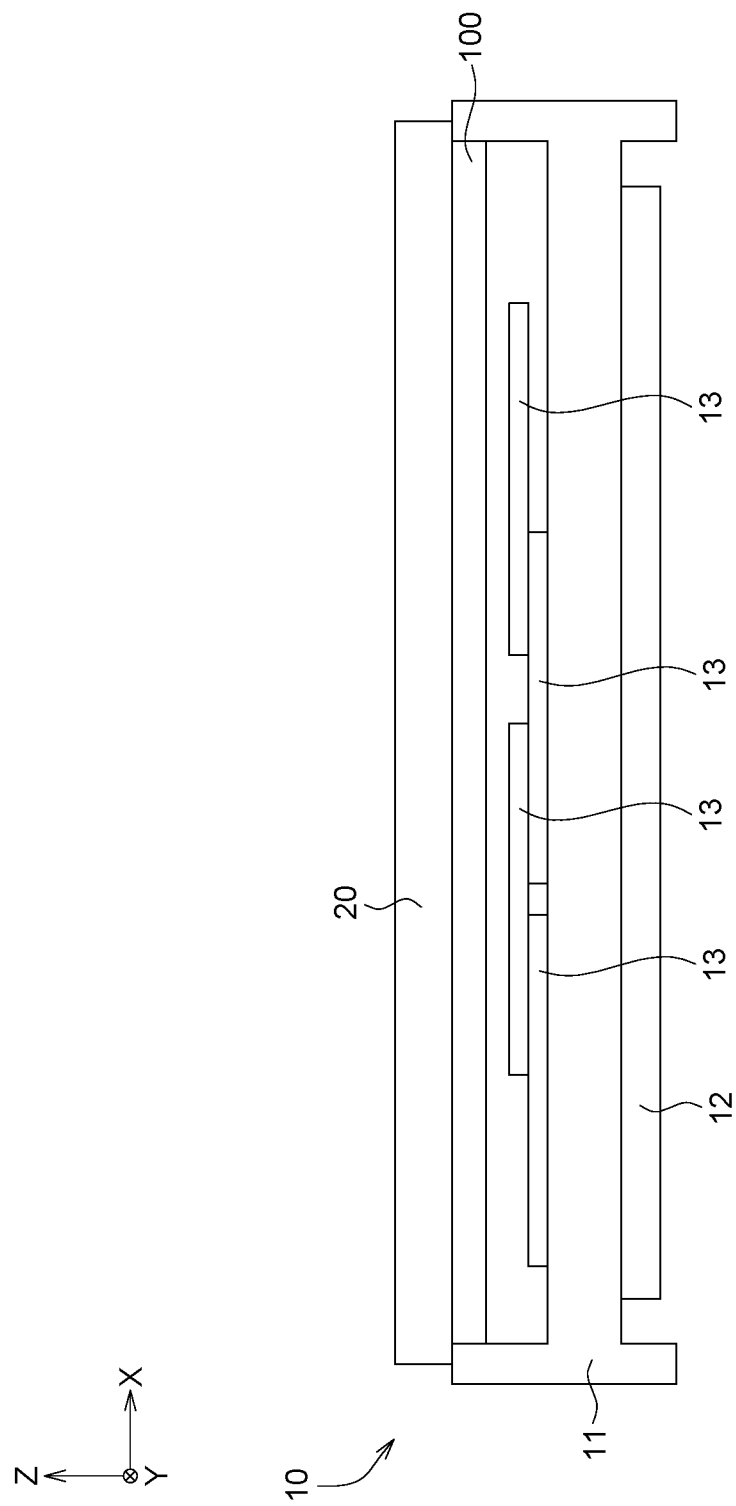
FIG. 1 illustrates a schematic diagram of the wireless charger and the electronic device according to an embodiment of the present invention.
Figure 2A:
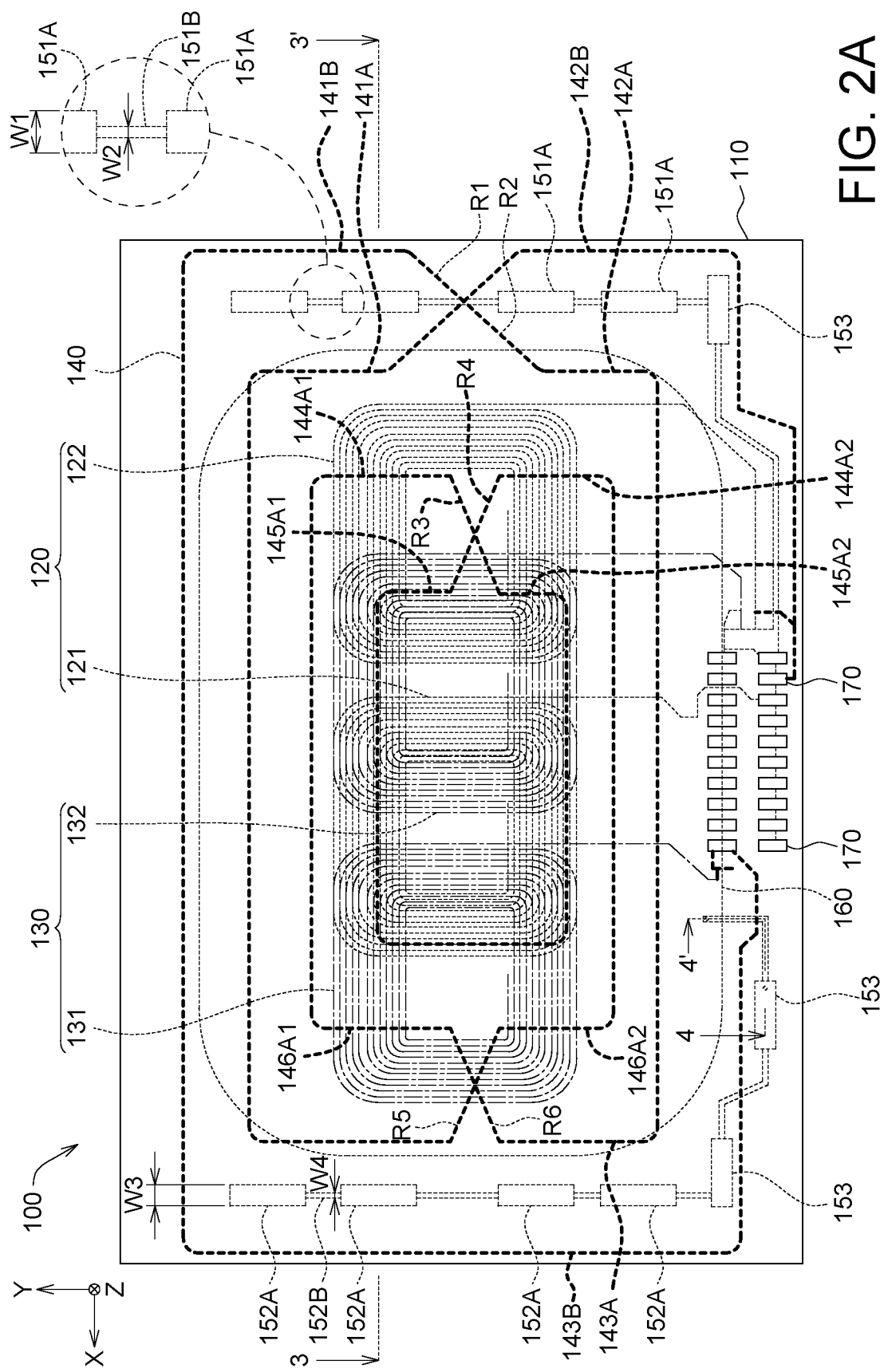
FIG. 2A illustrates a schematic diagram of the NFC circuit board of FIG. 1.
Figure 2B:
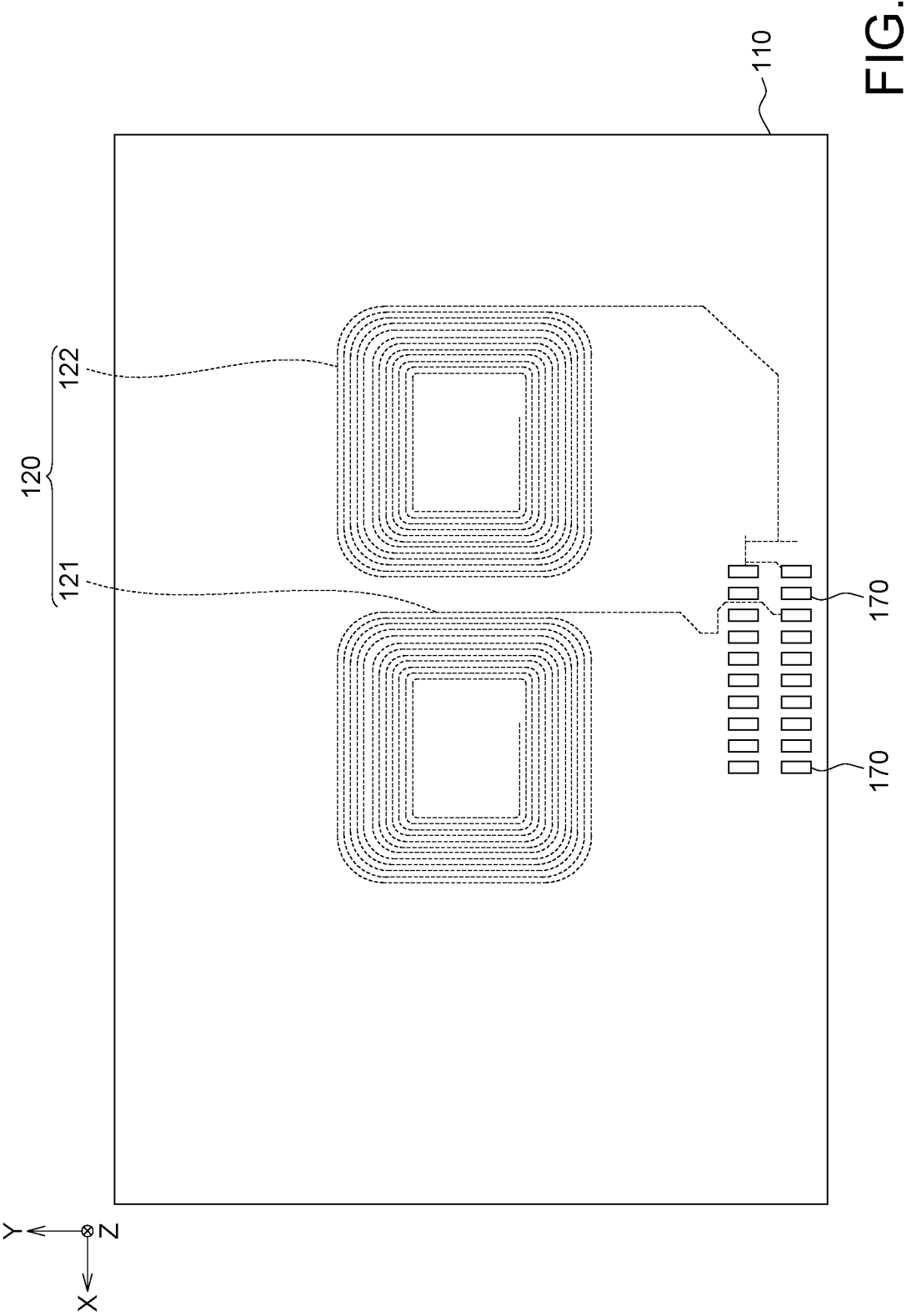
FIG. 2B illustrates a schematic diagram of the first induction coils of FIG. 2A.
Figure 2C:
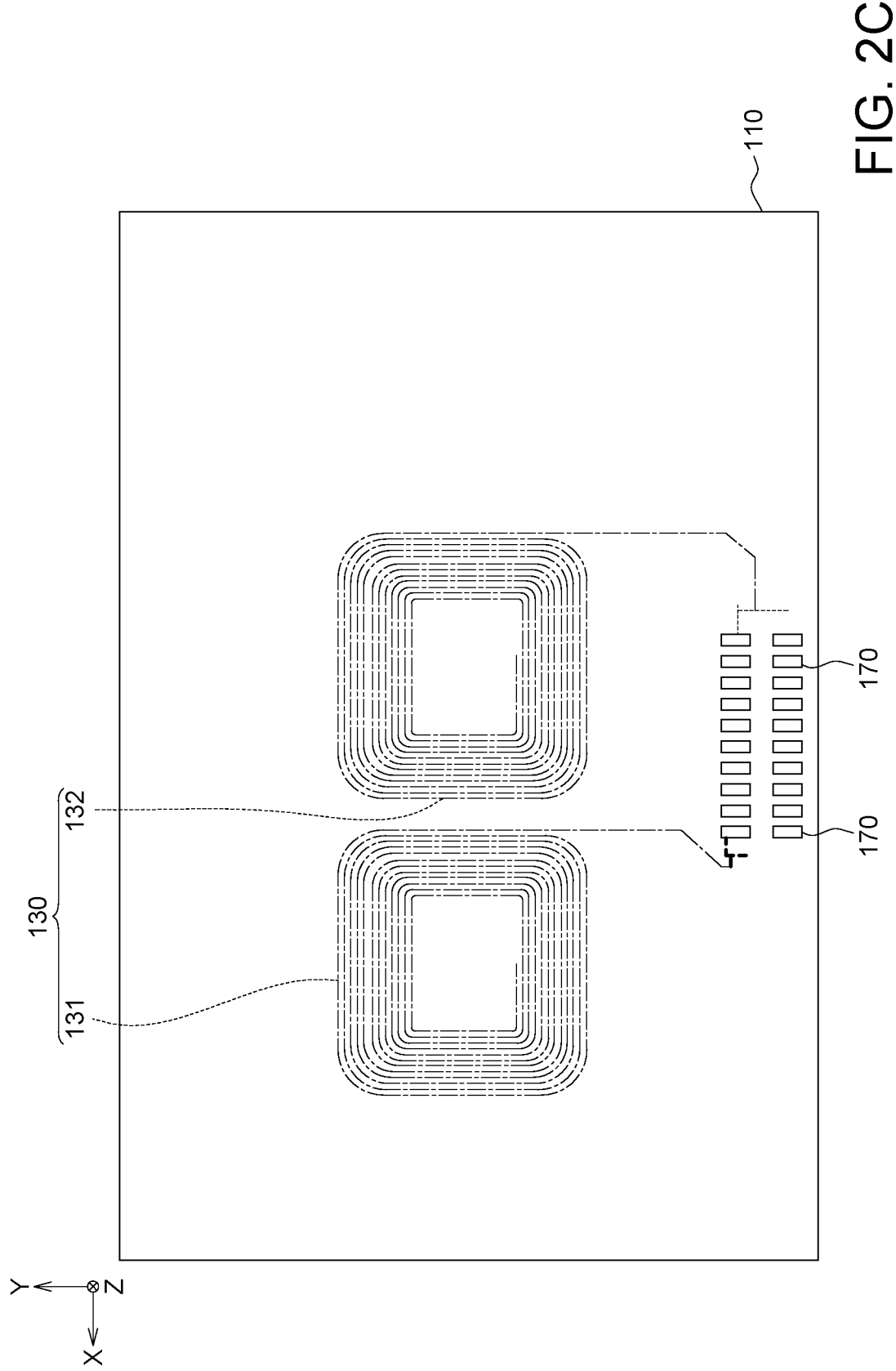
FIG. 2C illustrates a schematic diagram of the second induction coils of FIG. 2A.
Figure 3:
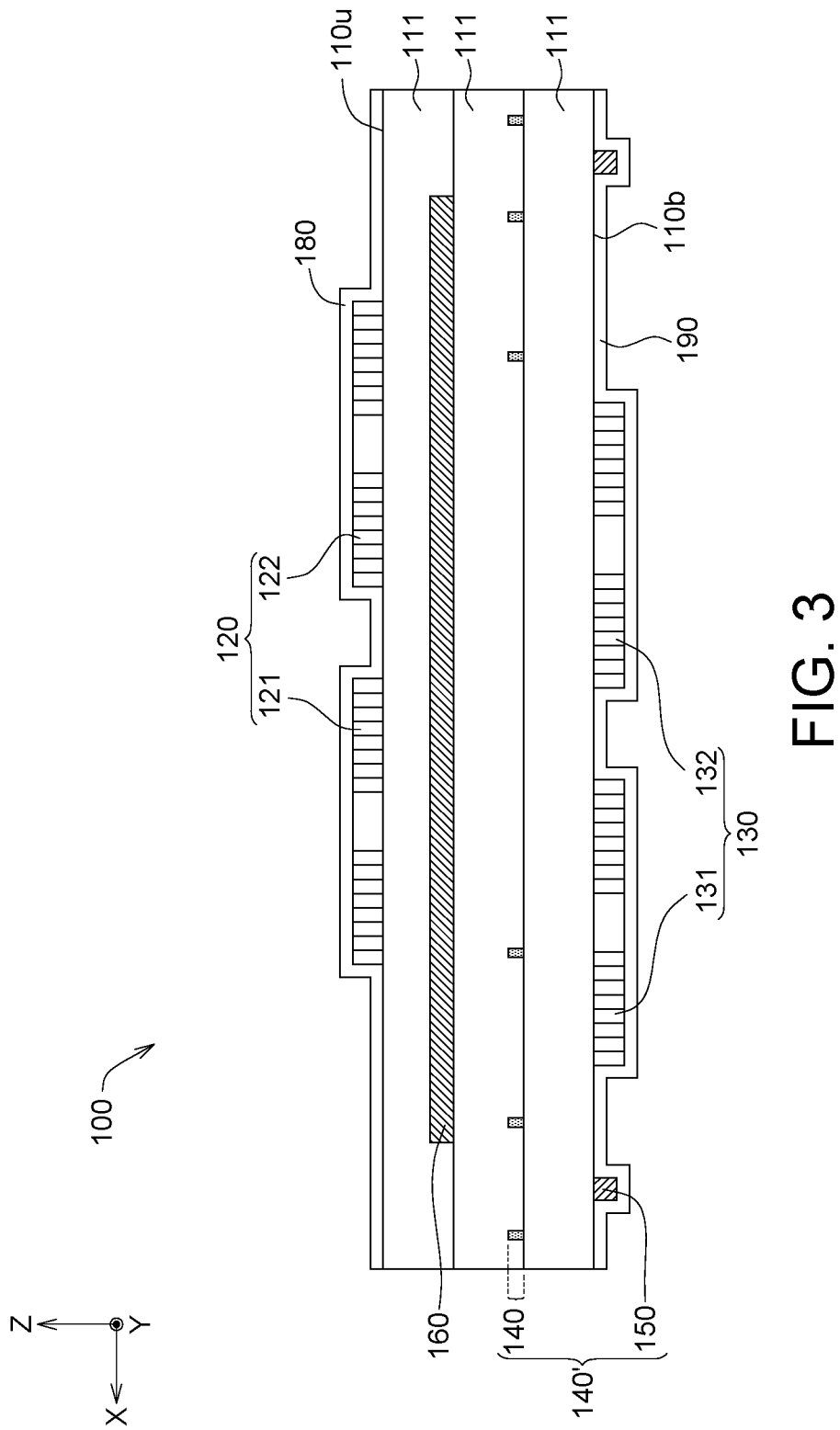
FIG. 3 illustrates the NFC circuit board of FIG. 2A along a direction 3-3'.
Figure 4:
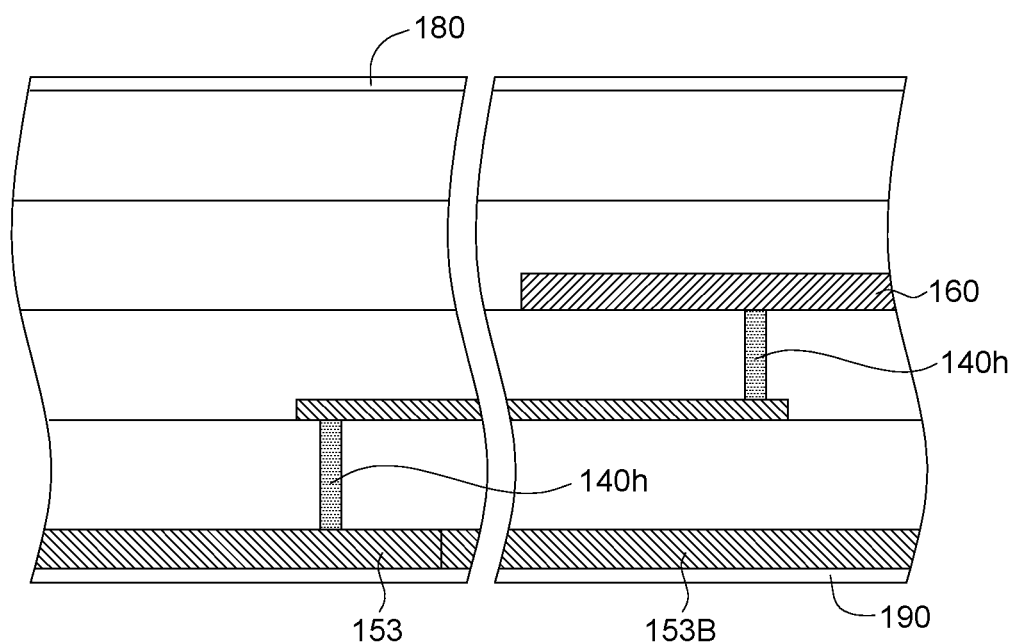
FIG. 4 illustrates a cross-sectional view of the NFC circuit board in FIG. 2A along a direction 4-4'.

Referring to FIGS. 1 to 4. FIG. 1 illustrates a schematic diagram of the wireless charger 10 and the electronic device 20 according to an embodiment of the present invention, FIG. 2A illustrates a schematic diagram of the NFC circuit board 100 of FIG. 1, FIG. 2B illustrates a schematic diagram of the first induction coils 120 of FIG. 2A, FIG. 2C illustrates a schematic diagram of the second induction coils 130 of FIG. 2A, and FIG. 3 illustrates the NFC circuit board 100 of FIG. 2A along a direction 3-3', and FIG. 4 illustrates a cross-sectional view of the NFC circuit board 100 in FIG. 2A along a direction 4-4'.

As illustrated in FIG. 1, the electronic device 20 could be placed on the wireless charger 10, so that the wireless charger 10 could charge the electronic device 20. The wireless charger 10 includes a base 11, a main circuit board 12, a plurality of charging coils 13 and an NFC circuit board 100. The main circuit board 12, a plurality of charging coils 13 and the NFC circuit board 100 are disposed on the base 11, wherein the NFC circuit board 100 is disposed opposite to the charging coils 13. The main circuit board 12 is electrically connected to the charging coils 13 and the NFC circuit board 100. The charging coils 13 could charge the electronic device 20 located above the charging coils 13. As illustrated in FIG. 4, four charging coils 13 are overlapped with each other. In addition, the electronic device 20 is, for example, a mobile phone, a tablet computer, or other electronic products supporting wireless charging technology.

As illustrated in FIGS. 2A to 3, the NFC circuit board 100 includes a substrate 110, a first induction coil 120, a second induction coil 130, and an NFC antenna 140, a conductive structure 150, a shielding layer 160, a plurality of contacts 170, a first protective layer 180 and a second protective layer 190, wherein the NFC antenna 140 and the conductive structure 150 constitute an NFC antenna structure 140'. The substrate 110 includes a plurality of dielectric layers 111. The first induction coil 120, the second induction coil 130, the NFC antenna 140 and the shielding layer 160 are separated and electrically isolated by these dielectric layers 111. The NFC circuit board 100 could be connected with the main circuit board 12 through the contact 170 to be electrically connected to the main circuit board 12.

The first induction coil 120 and the second induction coil 130 could sense an object located above the first induction coil 120 and the second induction coil 130. The main circuit board 12 could determine whether the object located above the wireless charger 10 is the electronic device 20 or a foreign object (not the electronic device 20) according to the signals from the first induction coil 120 and the second induction coil 130. When the electronic device 20 is located above the wireless charging base 10, the wireless charging base 10 charges the electronic device 20. When the foreign object is present on the wireless charging base 10, the wireless charger 10 does not charge the foreign object.

As illustrated FIGS. 2 to 3, the first induction coil 120 and the second induction coil 130 are two different layers of the NFC circuit board 100. As illustrated in figures, the first induction coil 120 includes a first coil 121 and a second coil 122, and the second induction coil 130 includes a third coil 131 and a fourth coil 132. The first induction coil 120 and the second induction coil 130 are staggered along an extension direction of the substrate 110 (such as the X-plane extension direction), and the first coil 121 and the third coil 131 partially overlap in a thickness direction (such as the Z direction) of the substrate 110, while the second coil 122 and the fourth coil 132 partially overlap in the thickness direction of the substrate 110. The first induction coil 120 and the second induction coil 130 staggered to each other could expand an induction range of the inducting foreign object. In addition, the NFC antenna 140 is formed between the first induction coil 120 and the second induction coil 130.

As illustrated in FIG. 3, the substrate 110 has a first surface 110u and a second surface 110b opposite to the first surface 110u, where the first surface 110u faces, for example, the electronic device 20, and the second surface 110b faces, for example, the main circuit board 12. The first protective layer 180 covers the first surface 110u of the substrate 110 and covers devices formed above the first surface 110u, such as the first induction coil 120. The second protective layer 190 covers the second surface 110b of the substrate 110 and covers devices formed above the second surface 110b, such as the second induction coil 130 and the conductive structure 150. The first protective layer 180 and the second protective layer 190 are, for example, the outermost layers of the NFC circuit board 100.

As illustrated in FIG. 3, the NFC antenna 140, the conductive structure 150 and the shielding layer 160 are three layers separated from each other. For example, the NFC antenna 140, the conductive structure 150 and the shielding layer 160 could be separated from each other by the dielectric layer 111. The shielding layer 160 could be a comb-like structure for shielding the E-field electromagnetic radiation emitted by the charging coils 13, while allowing the H-field electromagnetic radiation to pass through for charging the electronic device 20. The conductive structure 150 could compensate quality factor (Q-factor) of the NFC antenna 140 to increase pairing success rate of the NFC antenna 140 and the electronic device 20 and avoid the decrease (resulted by the interference of the first induction coil 120 and the second induction coil 130, a number of the charging coils 13 and shielding layer 160) of the Q-factor of the NFC antenna 140. The quality factor is obtained based on at least two of the resistance, inductance and capacitance of the NFC antenna 140. In addition, the design of the conductive structure 150 could change the field pattern of the NFC antenna 140 (for example, enhancing the signal strength at an edges of the NFC antenna 140) and expand the sensing range of the NFC antenna 140 (for example, the sensing range along the XY plane), and accordingly it could help to increase the pairing success rate of the NFC antenna 140 and the electronic device 20.

As illustrated in FIG. 2A, the NFC antenna 140 is a continuous wire, which extends to form an antenna pattern from one of the contacts 170 to another of the contacts 170. As illustrated in the figure, the NFC antenna 140 circlewise extends to form a first inner coil 141A and a first outer coil 141B. The first outer coil 141B is a first part of the outermost coil of the NFC antenna 140. The conductive structure 150 is formed corresponding to the range between the first inner coil 141A and the first outer coil 141B, and thus it could effectively increase the Q-factor of the NFC antenna 140.

Figure 5:
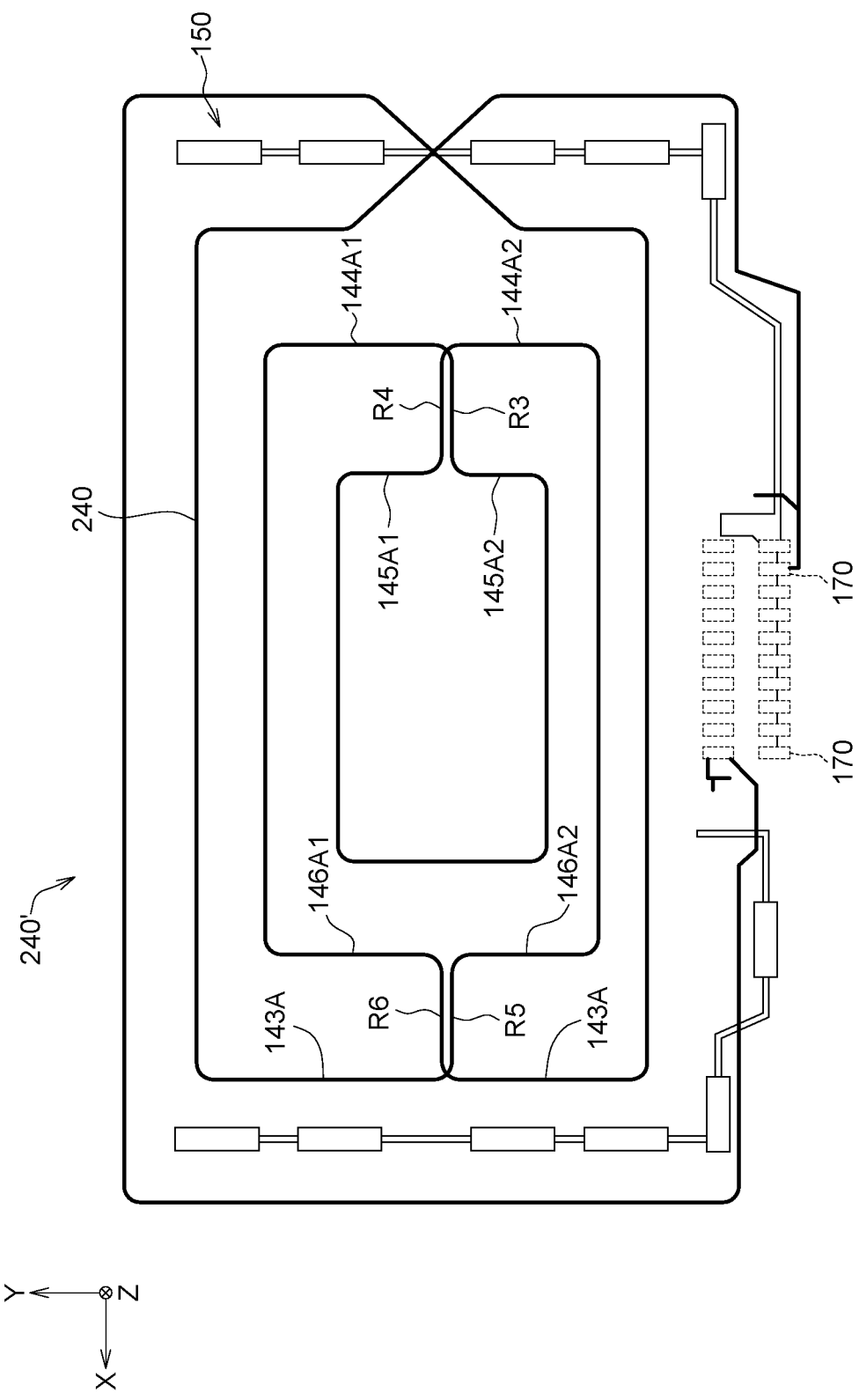
FIG. 5 illustrates a schematic diagram of an NFC antenna structure according to another embodiment of the present invention.

As illustrated in FIG. 2A, the NFC antenna 140 further circlewise extends to form a second inner coil 142A and a second outer coil 142B. The second outer coil 142B is a second part of the outermost coil of the NFC antenna 140. The conductive structure 150 is further formed corresponding to the range between the second inner coil 142A and the second outer coil 142B, and thus it could effectively increase the Q-factor of the NFC antenna 140. In addition, the NFC antenna 140 further circlewise extends to form a first connection line R1 and a second connection line R2. The first connection line R1 connects the first outer coil 141B and the second inner coil 142A, and the second connection line R2 connects the first inner coil 141A and the second outer coil 142B. The conductive structure 150 partially overlaps the first connection line R1 and the second connection line R2. For example, a first conductive line 151B of the conductive structure 150 overlaps an intersection of the first connection line R1 and the second connection line R2 in the Z direction, but the embodiment of the present invention is not limited thereto. In the present embodiment, the first connection line R1 and the second connection line R2 are arranged crosswise; however, in another embodiment, the first connection line R1 and the second connection line R2 may be disposed substantially in parallel (as illustrated in FIG. 5).

As illustrated in FIG. 2A, the NFC antenna 140 circlewise extends to form a third inner coil 143A and a third outer coil 143B, wherein the third outer coil 143B is a third part of the outermost coil of the NFC antenna 140. The third part and the aforementioned first part (or the second part) are opposite two parts of the outermost coil of the NFC antenna 140. The conductive structure 150 is further formed corresponding to the range between the third inner coil 143A and the third outer coil 143B, and thus it could effectively increase the Q-factor of the NFC antenna 140.

In addition, as illustrated in FIG. 2A, the NFC antenna 140 further circlewise extends to form fourth inner coils 144A1 and 144A2, fifth inner coil 145A1 and 145A2, and sixth inner coil 146A1 and 146A2. The fourth inner coils (144A and 144A2) are located between the fifth inner coils (145A1 and 145A2) and the first inner coils 141A (or the second inner coil 142A). The third inner coil 143A is located between the sixth inner coils (146A1 and 146A2) and the third outer coil 143B. The fifth inner coils 145A1, 145A2 and the sixth inner coils 146A1, 146A2 are the innermost portions of the NFC antenna 140. In addition, the NFC antenna 140 further includes a third connection line R3, a fourth connection line R4, a fifth connection line R5 and a sixth connection line R6. As illustrated in FIG. 2A, the third connection line R3 and the fourth connection line R4 are arranged crosswise, wherein the third connection line R3 connects the fourth inner coil 144A1 and the fifth inner coil 145A2, and the fourth connection line R4 connects the fourth inner coil 144A2 and the fifth inner coil 145A1. As illustrated in FIG. 2A, the fifth connection line R5 and the sixth connection line R6 are arranged crosswise, wherein the fifth connection line R5 connects the third inner ring line 143A and the sixth inner ring line 146A2, and the sixth connection line R6 connects The third inner coil 143A and the sixth inner coil 146A1.

As illustrated in FIG. 2A, the conductive structure 150 includes a plurality of first conductive portions 151A and a plurality of first conductive lines 151B. A width W1 of each first conductive portion 151A is greater than a width W2 of each first conductive line 151B, an area of each first conductive portion 151A is larger than a range of each first conductive line 151B, and two of the first conductive portions 151A are connected by the corresponding first conductive line 151B. The present embodiment of the invention does not limit a ratio of the width or the area of the first conductive portion 151A and the first conductive line 151B.

As illustrated in FIG. 2A, the conductive structure 150 includes a plurality of second conductive portions 152A and a plurality of second conductive lines 152B. A width W3 of each second conductive portion 152A is greater than a width W4 of each second conductive line 152B, an area of each second conductive portion 152A is larger than an area of each second conductive line 152B, and two of the conductive portions 152A are connected by the corresponding second conductive line 152B. The present embodiment of the invention does not limit a ratio of the width or the area of the second conductive portion 152A and the second conductive line 152B. In an embodiment, the shape and/or size of the second conductive portion 152A may be the same as that of the first conductive portion 151A, and the shape and/or size of the second conductive line 152B may be the same as the first conductive line 151B, but the present embodiment is not limited thereto.

As illustrated in FIG. 2A, due to the first conductive portion 151A and the first conductive line 151B being adjacent to or located on the first outermost side of the NFC antenna 140 and the second conductive portion 152A and the second conductive line 152B being adjacent to or located on the second outermost side of the antenna 140, it could compensate the signal strength of the edge of the NFC antenna 140 and therefore expand the sensing range of the NFC antenna 140.

As illustrated on the right side of FIG. 2A, the conductive structure 150 further includes at least one first connection portion 153. The first connection portion 153 is connected to the adjacent first conductive portion 151A with the corresponding first conductive line 151B. The extending direction of a long axis of the first connection portion 153 is substantially perpendicular to the arrangement direction of the first conductive portions 151. For example, the first conductive portions 151A are arranged substantially along the Y direction, and the first connecting portions 153 are extended substantially along the X direction; however the embodiment of the present invention is not limited thereto. Similarly, as illustrated on the left side of FIG. 2A, the first connection portion 153 and the adjacent second conductive portion 152A are connected with the corresponding second conductive line 152B. The extension direction of the long axis of the first connection portion 153 is substantially perpendicular to the arrangement direction of the second conductive portions 152A. For example, the second conductive portions 152A are substantially arranged along the Y direction, and the first connecting portions 153 are substantially extended along the X direction; however, the embodiment of the present invention is not limited thereto.

As illustrated in FIG. 2A, the conductive portion (the first conductive portion 151A and the second conductive portion 152A) and the conductive line (the first conductive line 151B and the second conductive line 152B) of the conductive structure 150 and the induction coil (the first induction coil 120 and the second induction coil 130) are completely staggered along the XY plane, that is, the conductive portion and the conductive line of the conductive structure 150 do not overlap the induction coil in the Z direction, so that the conductive structure 150 is prevented from being misjudged as a foreign object by the first induction coil 120 and the second induction coil 130.

As illustrated in FIGS. 2A to 2C and FIG. 4, the NFC antenna structure 140' further includes at least one conductive via 140h and a second connection portion 153B. The conductive via 140h is formed between the conductive structure 150 and the shielding layer 160 and connects the conductive structure 150 and the shielding layer 160. In detail, the second connection portion 153B is connected to the first connection portion 153 and is connected to the shielding layer 160 through at least one conductive via 140h, so that the second conductive portion 152A connected to the first connection portion 153 could be electrically connected to the shielding layer 160 through the first connection portion 153, the second connection portion 153B and the conductive via 140h. The shielding layer 160 could be electrically connected to a contact 170 which is electrically connected to ground potential through other conductive vias. As a result, the conductive structure 150 could be electrically connected to the ground potential through the conductive via 140h and the shielding layer 160. The first conductive portion 151A could also be electrically connected to the ground potential in a similar manner. However, the embodiment of the present invention does not limit the grounding manner of the conductive structure 150. In another embodiment, the first connection portion 151A and/or the second conductive portion 152A of the conductive structure 150 may extend to the contact 170 which is electrically connected to ground potential on the same layer.

Referring to FIG. 5, FIG. 5 illustrates a schematic diagram of an NFC antenna structure 240' according to another embodiment of the present invention. The NFC antenna structure 140' of the NFC circuit board 100 of FIG. 2A may be replaced with an NFC antenna structure 240'. The NFC antenna structure 240' includes an NFC antenna 240 and the conductive structure 150. The NFC antenna 240 of the present embodiment has a structure similar to or the same as that of the aforementioned NFC antenna 140, except that the third connection line R3 and the fourth connection line R4 of the NFC antenna 240 are disposed substantially in parallel and the connection line R5 and the sixth connection line R6 are arranged substantially in parallel.

Figure 6:
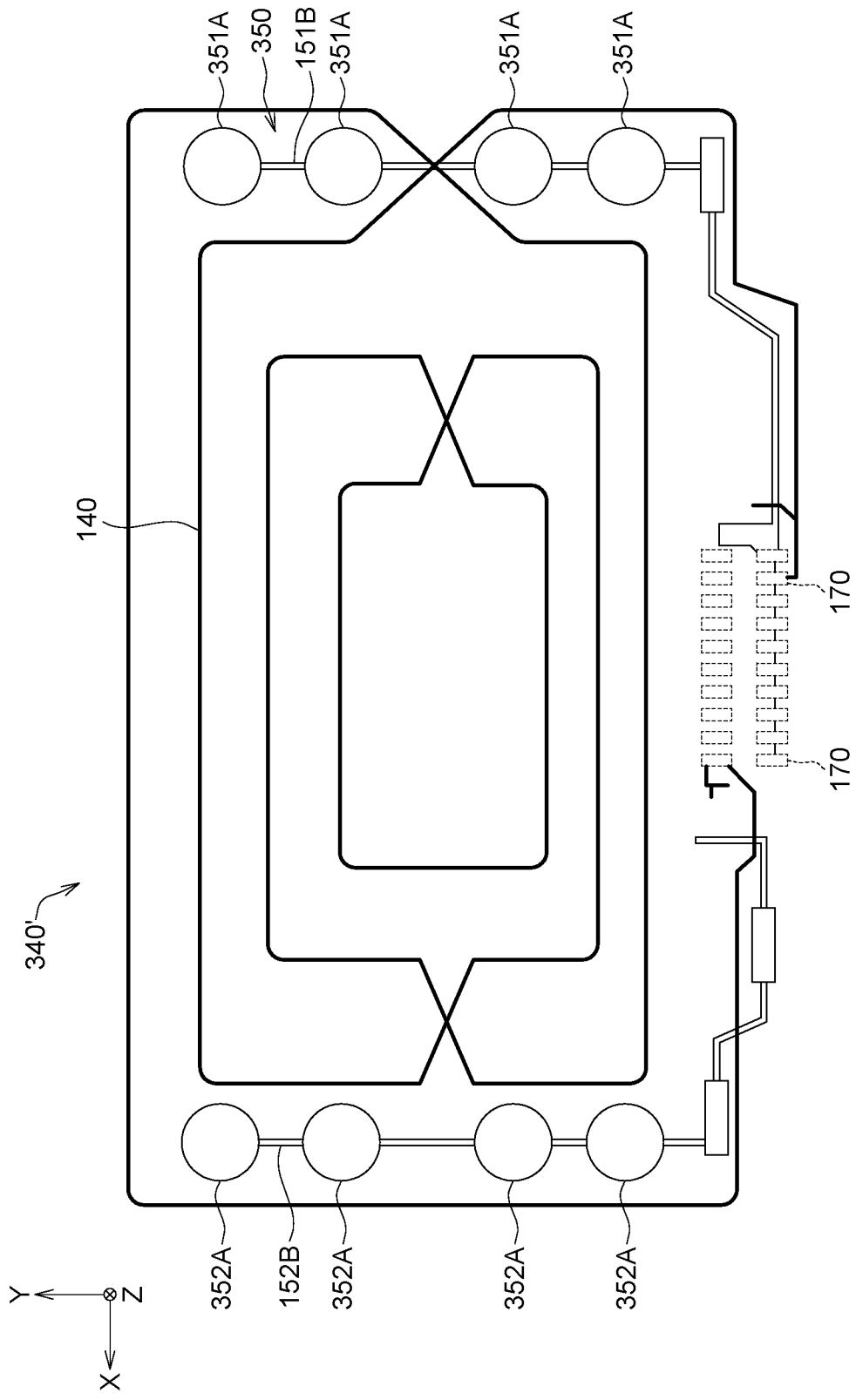
FIGS. 6 to 8 illustrate schematic diagrams of NFC antenna structures according to several embodiments of the present invention.
Figure 7:
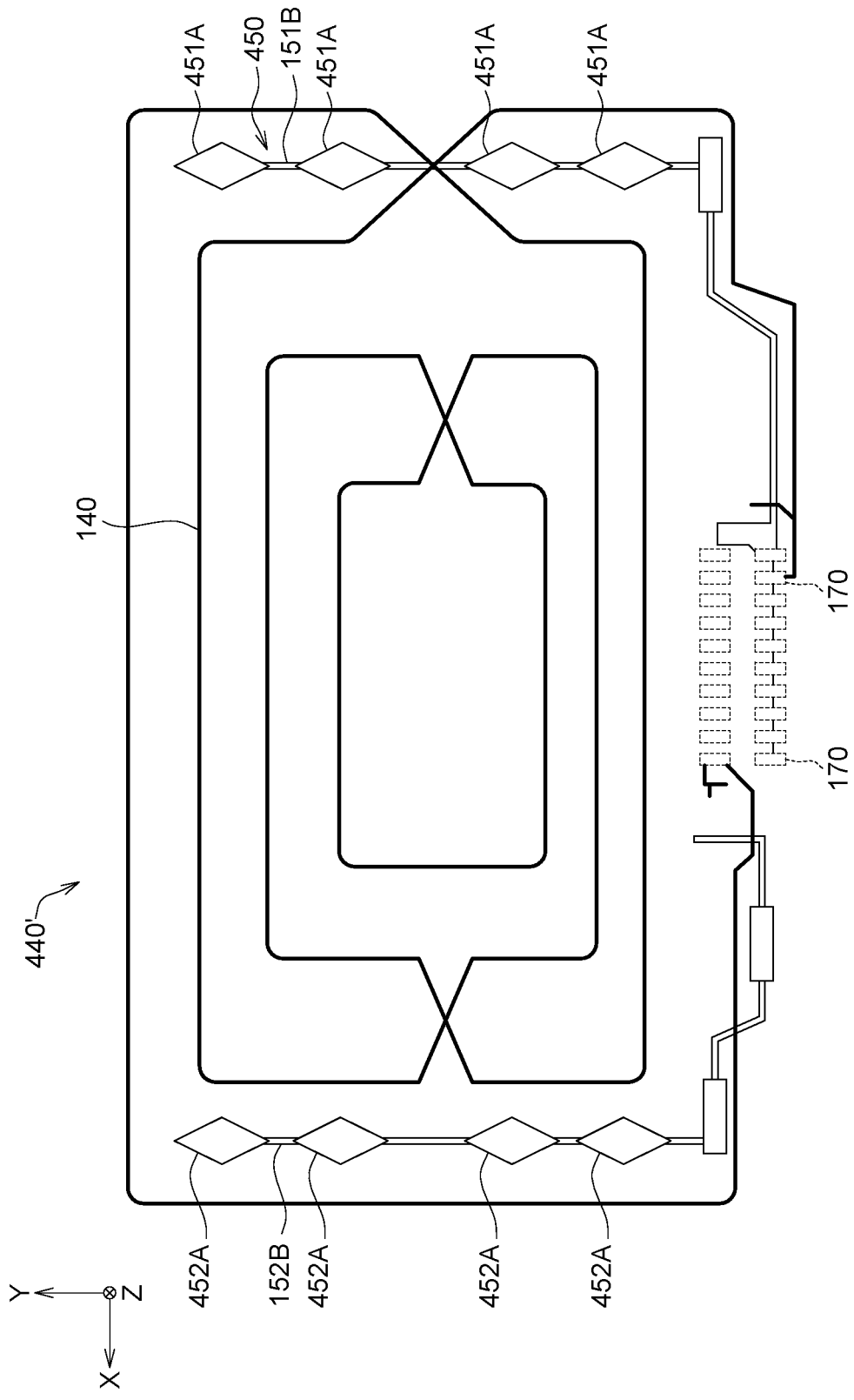
Figure 8:
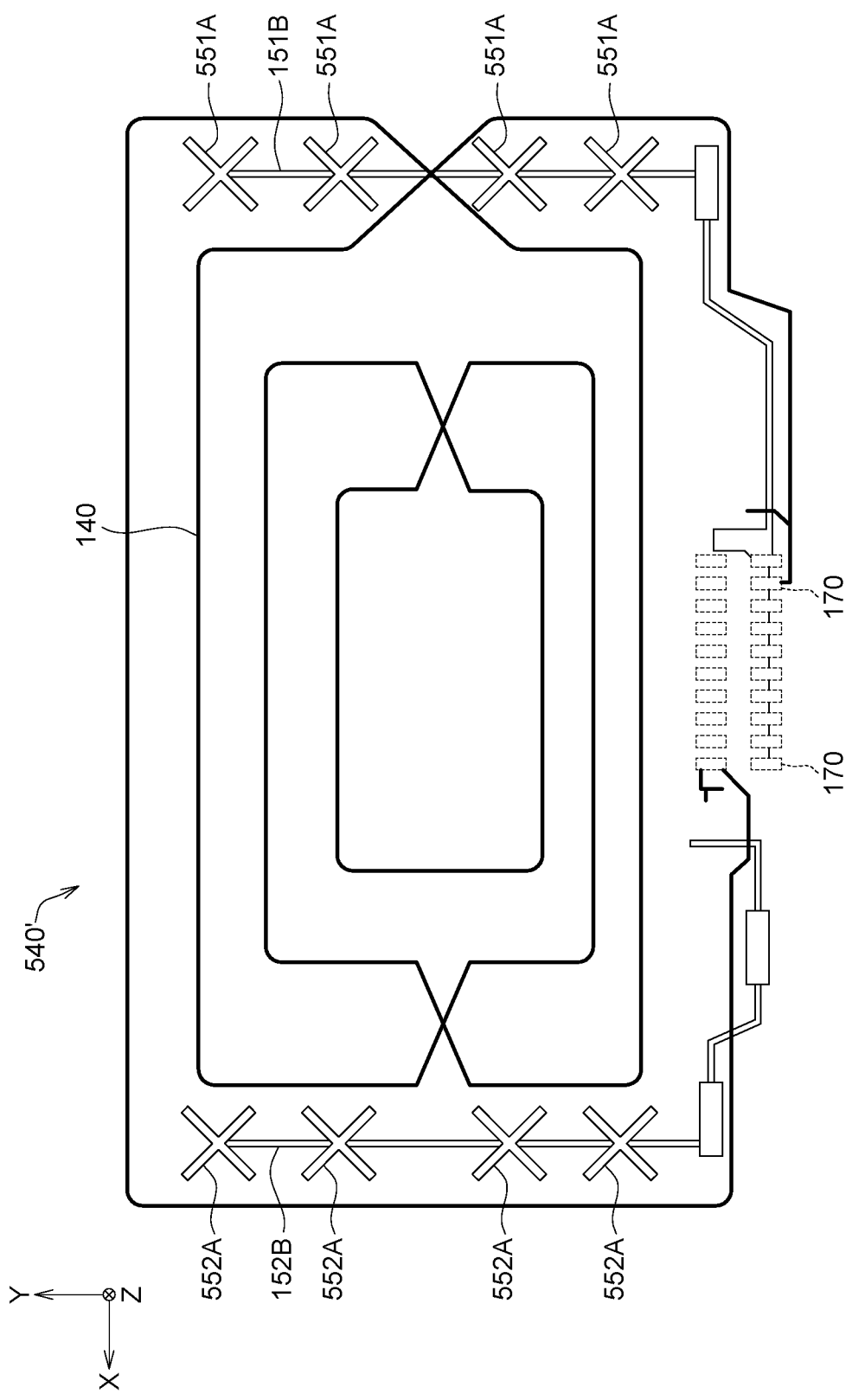

Although the first conductive portion 151A and the second conductive portion 152A of the above embodiments are described by taking a polygon, such as a rectangular shape or a strip shape as an example, the embodiment of the present invention is not limited thereto. Referring to FIGS. 6 to 8, which illustrate schematic diagrams of NFC antenna structures 340' to 540' according to several embodiments of the present invention. Any of the NFC antenna structures 340' to 540' could replace the NFC antenna structure 140' of FIG. 2A.

As illustrated in FIG. 6, the NFC antenna structure 340' includes the NFC antenna 140 and a conductive structure 350. The conductive structure 350 includes a plurality of first conductive portions 351A, a plurality of the first conductive lines 151B, a plurality of second conductive portions 352A and a plurality of the second conductive lines 152B. The first conductive portion 351A, the first conductive line 151B, the second conductive portion 352A and the second conductive line 152B in the present embodiment are similar to the first conductive portion 151A, the first conductive line 151B, the second conductive portion 152A and the second conductive line 152B respectively, except that the shapes of the first conductive portion 351A and the second conductive portion 352A are circular.

As illustrated in FIG. 7, an NFC antenna structure 440' includes the NFC antenna 140 and a conductive structure 450. The conductive structure 450 includes a plurality of first conductive portions 451A, a plurality of the first conductive lines 151B, a plurality of second conductive portions 452A and a plurality of the second conductive lines 152B. The first conductive portion 451A, the first conductive line 151B, the second conductive portion 452A and the second conductive line 152B in the present embodiment are similar to the aforementioned first conductive portion 151A, the first conductive line 151B, the second conductive portion 152A and the second conductive line 152B respectively, except that the shapes of the first conductive portion 451A and the second conductive portion 452A are prismatic.

As illustrated in FIG. 8, an NFC antenna structure 540' includes the NFC antenna 140 and a conductive structure 550. The conductive structure 550 includes a plurality of first conductive portions 551A, a plurality of the first conductive lines 151B, a plurality of second conductive portions 552A and a plurality of the second conductive lines 152B. The first conductive portion 551A, the first conductive line 151B, the second conductive portion 552A, and the second conductive line 152B in the present embodiment are similar to the first conductive portion 151A, the first conductive line 151B, the second conductive portion 152A and the second conductive portion 152B respectively, except that the shapes of the first conductive portion 551A and the second conductive portion 552A are cross-shaped.

In summary, the first conductive portion and/or the second conductive portion of the conductive structure may have various shapes, such as a circular shape, a polygonal shape (such as a rectangle, a square, a triangle, etc.), an ellipse, a cross shape, etc. In addition, the shape of each first conductive portion of the conductive structure may be the same, the shape of each second conductive portion of the conductive structure may be the same, or the shape of each first conductive portion and the shape of each second conductive portion may be the same. Alternatively, the shapes of the first conductive portions of the conductive structure may be different, the shapes of the second conductive portions of the conductive structure may be different, or the shape of one or some of the first conductive portions and one or some of the second conductive portions may be different. The embodiment of the present invention does not limit the shape, size, and the number of the first conductive portions or the second conductive portions, as long as it is conducive to increasing the pairing success rate of the NFC antenna and the electronic device and/or positively changes the field pattern of the NFC antenna.

Since the NFC antenna structure of the embodiment of the present invention has a conductive structure, it could effectively increase the quality factor of the NFC antenna and expand the sensing range of the NFC antenna. According to software simulation results, when the first conductive portion and/or the second conductive portion is circular, the quality factor of the NFC antenna is relatively better and could effectively expand the sensing range (that is, reducing the sensing blind area) of the NFC antenna in comparison with the prism, rectangle and cross shape.

As described above, the NFC antenna structure according to the embodiment of the present invention includes an NFC antenna and a conductive structure, wherein the conductive structure is formed corresponding to a range between an inner coil and an outer coil of the NFC antenna. As a result, it could compensate the quality factor (Q-factor) of the NFC antenna and increase the pairing success rate of the NFC antenna and electronic device. In an embodiment, the position of the conductive structure corresponds to the outermost range of the NFC antenna (or the conductive structure is disposed adjacent to the side of the outer boundary of the substrate), such that the conductive structure could enhance the signal strength of the edge of the NFC antenna (changing the field pattern of the NFC antenna, and expanding the sensing range of the NFC antenna (that is, reducing the sensing blind area), and also will be conducive to increasing the pairing success rate of the NFC antenna and the electronic device.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A Near-Field Communication (NFC) antenna structure, comprises:
   an NFC antenna, circlewise extending to form a first inner coil and a first outer coil; and
   a conductive structure, formed corresponding to a region between the first inner coil and the first outer coil;
   wherein the conductive structure comprises a plurality of first conductive portions and a plurality of first conductive lines, two of the first conductive portions are connected with the corresponding first conductive line; the first conductive portions and the first conductive lines are formed corresponding to a range between the first inner coil and the first outer coil.

2. The NFC antenna structure according to claim 1, wherein the NFC antenna and the conductive structure are two layers separated from each other.

3. The NFC antenna structure according to claim 1, wherein a width of each first conductive portion is greater than a width of each first conductive line.

4. The NFC antenna structure according to claim 1, wherein the NFC antenna circlewise extends to form a second inner coil and a second outer coil, the NFC antenna further comprises a first connection line and a second connection line, the first connection line connects the first outer coil and the second inner coil, the second connecting line connects the first inner coil and the second outer coil;

the conductive structure is further formed corresponding to a region between the second inner coil and the second outer coil and partially overlaps the first connection line and the second connection line.

5. The NFC antenna structure according to claim 4, wherein the first connection line and the second connection line are arranged crosswise or in parallel.

6. The NFC antenna structure according to claim 1, wherein the conductive structure further comprises a first connection portion, and the first connection portion is connected to the adjacent first conductive portion by the corresponding first conductive line; an extension direction of a long axis of the first connection portion is substantially perpendicular to an arrangement direction of the first conductive portions.

7. The NFC antenna structure according to claim 1, wherein each first conductive portion is circular shape, polygonal shape or cross-shape.

8. The NFC antenna structure according to claim 1, wherein the NFC antenna further circlewise extends to form a third inner coil and a third outer coil, and the third outer coil and the first outer coil are opposite two parts of the outermost coil of the NFC antenna respectively; the conductive structure is formed corresponding to a range between the third inner coil and the third outer coil.

9. The NFC antenna structure according to claim 8, wherein the conductive structure comprises a plurality of second conductive portions and a plurality of second conductive lines, and two of the second conductive portions are connected by the corresponding second conductive line; the second conductive portions and the second conductive lines are formed corresponding to the range between the third inner coil and the third outer coil.

10. The NFC antenna structure according to claim 9, wherein a width of each second conductive portion is greater than a width of each second conductive line.

11. The NFC antenna structure according to claim 1, further comprises:
a conductive via, formed between the conductive structure and a shielding layer;
wherein the conductive via connects the conductive structure and the shielding layer.

12. The NFC antenna structure according to claim 11, wherein the NFC antenna, the conductive structure and the shielding layer are three layers separated from each other.

13. The NFC antenna structure according to claim 1, wherein the conductive structure is electrically grounded.

14. An NFC circuit board, comprises:
a substrate having a first surface and a second surface opposite to the first surface;
a first induction coil formed on the first surface;
a second induction coil formed on the second surface; and
an NFC antenna structure, formed between the first induction coil and the second induction coil and comprising:
an NFC antenna circlewise extending to form a first inner coil and a first outer coil; and
a conductive structure formed corresponding to a region between the first inner coil and the first outer coil;
wherein the conductive structure comprises a plurality of first conductive portions and a plurality of first conductive lines, two of the first conductive portions are connected with the corresponding first conductive line; the first conductive portions and the first conductive lines are formed corresponding to a range between the first inner coil and the first outer coil.

15. The NFC circuit board according to claim 14, wherein the NFC antenna and the conductive structure are two layers separated from each other.

16. The NFC circuit board according to claim 14, wherein a width of each first conductive portion is greater than a width of each first conductive line.

17. The NFC circuit board according to claim 14, wherein the NFC antenna circlewise extends to form a second inner coil and a second outer coil, the NFC antenna further comprises a first connection line and a second connection line, the first connection line connects the first outer coil and the second inner coil, the second connecting line connects the first inner coil and the second outer coil; the conductive structure is further formed corresponding to a region between the second inner coil and the second outer coil and partially overlaps the first connection line and the second connection line.

18. The NFC circuit board according to claim 17, wherein the first connection line and the second connection line are arranged crosswise or in parallel.

19. The NFC circuit board according to claim 14, wherein the conductive structure is electrically grounded.

20. The NFC antenna structure according to claim 14, further comprises a shielding layer formed between the first induction coil and the second induction coil wherein the first inner coil of the NFC antenna overlaps with the shielding layer in a thickness direction.

* * * * *